United States Patent
Inoue et al.

(10) Patent No.: US 8,164,576 B2
(45) Date of Patent: Apr. 24, 2012

(54) CORRECTING COORDINATES ON TOUCH PANEL TO TRUE DISPLAY COORDINATES

(75) Inventors: Tomomi Inoue, Tokyo (JP); Yoshifumi Sakamoto, Shiga-ken (JP); Koki Shimohashi, Shiga-ken (JP); Manabu Toyota, Kyoto-Prefecture (JP)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 12/189,979

(22) Filed: Aug. 12, 2008

(65) Prior Publication Data

US 2009/0046079 A1 Feb. 19, 2009

(30) Foreign Application Priority Data

Aug. 15, 2007 (JP) .................. 2007-211656

(51) Int. Cl.
*G06F 3/041* (2006.01)
*G06K 11/06* (2006.01)
(52) U.S. Cl. ..................................... 345/173; 178/18.02
(58) Field of Classification Search .......... 345/173–178; 178/18.02
See application file for complete search history.

(56) References Cited

U.S. PATENT DOCUMENTS

2005/0078095 A1 * 4/2005 Ung et al. .................... 345/175

FOREIGN PATENT DOCUMENTS

JP 61-101829 5/1986

* cited by examiner

*Primary Examiner* — Richard Hjerpe
*Assistant Examiner* — Alecia D English
(74) *Attorney, Agent, or Firm* — Matthew C. Zehrer

(57) ABSTRACT

Detect four sets of first touch coordinates (A, B, C, D) on a touch panel. Divide an area delimited by the detected four sets into two areas of triangles (ABD, BCD). For each area of triangle, obtain a first correction factor. Detect a set of second touch coordinates (P, Q) selected within a respective one of the areas of triangles. Convert the detected set of second touch coordinates into a set of first corrected coordinates. Detect a difference between the set of first corrected coordinates and a set of true display coordinates. Where the detected difference is greater than a predetermined threshold value, further divide the area of triangle (BCD) into three areas of triangles (QBD, QBC, QCD). Obtain a second correction factor using the set of second touch coordinates and the sets of first touch coordinates corresponding to the vertices.

6 Claims, 2 Drawing Sheets

CORRECTING COORDINATES ON TOUCH PANEL TO TRUE DISPLAY COORDINATES

FIELD OF THE INVENTION

The present invention relates to a touch panel. More particularly, the present invention relates to a method of correcting coordinates on a touch panel to true display coordinates.

BACKGROUND OF THE INVENTION

A touch panel is provided in front of a display of various devices, and is used for inputting to the device the (positional) information of a portion of the surface touched by a finger or a pen. The touch panel is used as an input device for personal computers (PCs), a variety of ticket vending machines, multifunction peripherals (MFPs), and the like. To accurately convey the input information to the device, it is desirable that the touched position on the touch panel coincides with an actual (true) display position on the display as much as possible.

However, when attaching a touch panel to a display, a positional displacement may occur therebetween. Further, in the case of a touch panel using a resistive film, non-uniformity of the resistive film may lead to a decrease in linearity of the positional information that is determined according to a resistance value, thereby causing a displacement between the touched, input position on the panel and the actual (true) display position. In general, variation of the resistance value increases at the center of the panel, and thus, the displacement between the input position touched on the panel and the true display position would increase at the center of the panel.

As a way of correcting such a displacement of the display position, there is conventionally known a method of causing an operator to touch a plurality of points on the panel or draw lines on the panel and using these correction points (lines) to estimate the displacements of the display positions over the entire panel. With this method, however, the displacement of the display position is corrected only on the points (correction points) or the lines on the panel, not in any location other than the correction points (lines).

As another conventional way of correcting the displacement of the display position, Japanese Unexamined Patent Publication (Kokai) No. 61-101829 discloses a method where a panel is divided into a plurality of areas and a correction factor is obtained for each area, and the correction factor is used to correct detected coordinates to obtain true display coordinates. In this method, however, the panel is mechanically divided into triangles of the identical shape, and according to the number of division N, a positional displacement error α is reduced to (α/N). If the displacement of the display position varies in magnitude according to the position on the panel, the displacement may not be corrected sufficiently. In other words, with this conventional method, the positional displacement may not be corrected meticulously in accordance with the positions on the panel. Since panels may have their own tendencies regarding the displacements of the display positions, it is highly likely that the conventional method cannot perform appropriate correction for each panel.

SUMMARY OF THE INVENTION

According to an embodiment of the present invention, there is provided a method of correcting coordinates on a touch panel to true display coordinates. The method includes: detecting four sets of first touch coordinates separate from each other on the touch panel; dividing an area delimited by the detected four sets of first touch coordinates on the touch panel into two areas of triangles; for each area of triangles, obtaining a first correction factor using the detected three sets of first touch coordinates corresponding to vertices of the triangle; detecting a set of second touch coordinates selected within a respective one of the areas of triangles; converting the detected set of second touch coordinates into a set of first corrected coordinates using the first correction factor; detecting a difference between the set of first corrected coordinates and a set of true display coordinates corresponding to the set of second touch coordinates; in the case where the detected difference is greater than a predetermined threshold value, further dividing the area of triangle having the set of second touch coordinates included therein into three areas of triangles having the set of second touch coordinates as their common vertex; and for each of the three areas of triangles, obtaining a second correction factor using the set of second touch coordinates and the sets of first touch coordinates corresponding to vertices of the triangle.

DETAILED DESCRIPTION OF THE INVENTION

Figure 1A:
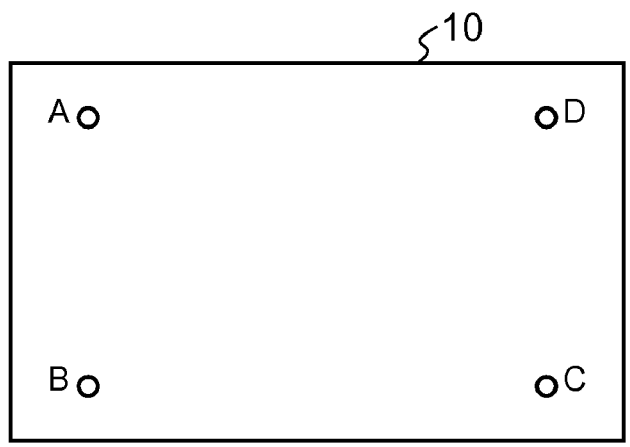
FIGS. 1A-1D show a flow of the method of the present invention.

The present invention will now be described with reference to the drawings. FIGS. 1A-1D show a flow of an embodiment of the method of the present invention. In FIG. 1A, four correction points (first touch coordinates) separate from each other, A(x1, y1), B(x2, y2), C(x3, y3), and D(x4, y4), are displayed on a touch panel 10. Specifically, the positions on the panel corresponding to the respective sets of coordinates are indicated by blinking or the like. The coordinates of the four correction points correspond to the coordinates that are supposed to be displayed ("true coordinates"). Generally, the four correction points are desirably set near the four corners, respectively, of the touch panel 10. In the case where correction is desired in a small area on the panel, four points may be determined to delimit the area. An operator is caused to touch the four correction points, and the coordinates of the touched points, A'(x1', y1'), B'(x2', y2'), C'(x3', y3'), and D'(x4', y4'), are measured (detected). For the detection, a processor (CPU or the like) detects resistance and/or capacitance values (or changes thereof), as in the case of position detection for a conventional touch panel. In general, there occurs differences (displacements) of the detected coordinates A', B', C', and D' from the initially displayed coordinates A, B, C, and D.

Figure 1B:
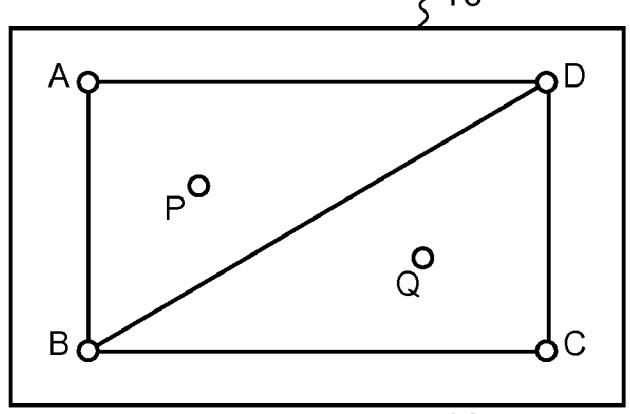

In FIG. 1B, the area (rectangle) delimited by the four correction points is divided into two triangles (ABD and BCD). Each triangle has vertices corresponding to the correction points. Instead of the example shown in FIG. 1B, two triangles ABC and ACD may be selected. For each of the triangles ABD and BCD, first correction factors are calculated using the detected coordinates A', B' and D', or B', C' and D' of the three correction points corresponding to vertices thereof. Firstly, the relationship between the coordinates (x, y) after correction and the coordinates (x', y') before correction is approximated by the following linear expressions.

$$x = a \cdot x' + b \cdot y' + c \quad (1)$$

$$y = d \cdot x' + e \cdot y' + f \quad (2)$$

where a through f are elements of a correction factor to be obtained.

The coordinates of the three correction points corresponding to the vertices of the triangle ABD, A(x1, y1), B(x2, y2) and D(x4, y4), and the measured coordinates corresponding thereto, A'(x1', y1'), B'(x2', y2') and D'(x4', y4'), are substituted into the above two expressions to thereby obtain six relational expressions in total. The six expressions are expressed by a matrix form as follows.

$$\begin{bmatrix} x_1 & y_1 \\ x_2 & y_2 \\ x_4 & y_4 \end{bmatrix} = \begin{bmatrix} x'_1 & y'_1 & 1 \\ x'_2 & y'_2 & 1 \\ x'_4 & y'_4 & 1 \end{bmatrix} \begin{bmatrix} a & d \\ b & e \\ c & f \end{bmatrix} \quad (3)$$

Based on the matrix expression (3), it is possible to obtain the elements of the correction factor a through f from the following expression. The same applies to the case of obtaining the correction factor for the triangle BCD.

$$\begin{bmatrix} a & d \\ b & e \\ c & f \end{bmatrix} = \begin{bmatrix} x'_1 & y'_1 & 1 \\ x'_2 & y'_2 & 1 \\ x'_4 & y'_4 & 1 \end{bmatrix}^{-1} \begin{bmatrix} x_1 & y_1 \\ x_2 & y_2 \\ x_4 & y_4 \end{bmatrix} \quad (4)$$

In FIG. 1B, evaluation points (second touch coordinates) P(x5, y5) and Q(x6, y6) are displayed in the respective triangles. Each of the evaluation points P and Q may be positioned at the center of the corresponding triangle, because at the center of the triangle farthest from the actually measured three correction points corresponding to the vertices of the triangle, the positional displacement and, hence, the necessity of correction is greatest. The operator is caused to touch the evaluation points. The touched coordinates of the evaluation points, P'(x5', y5') and Q'(x6', y6'), are measured (detected). It is noted that display and detection of the evaluation points P and Q may be carried out at the same time as display and detection of the four correction points A, B, C, and D described above. The detected coordinates P'(x5', y5') and Q'(x6', y6') of the evaluation points P and Q are substituted into the expressions (1) and (2), and converted to first corrected coordinates P"(X5, Y5) and Q"(X6, Y6). For the coefficients a through f in the expressions (1) and (2), the values obtained from the expression (4) are used.

Figure 1C:
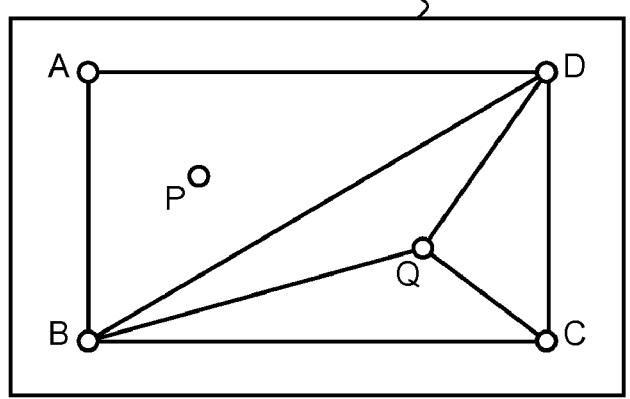

The difference between each set of the first corrected coordinates P"(X5, Y5), Q"(X6, Y6) and the corresponding set of true display coordinates P(x5, y5), Q(x6, y6) is detected. If the detected difference is greater than a predetermined threshold value, the area of triangle including that evaluation point is divided into three areas of triangles having the evaluation point as their common vertex. The threshold value is predetermined based on information as to whether the displacement would cause a problem in display property or would be tolerable from experience, for example. The threshold value can be changed arbitrarily in accordance with the position on the panel (center, peripheral, or the like). FIG. 1C shows the case where the triangle BCD is further divided into three triangles. The triangle BCD is made up of three triangles QBD, QBC and QCD having the evaluation point Q as their common vertex. In this case, the difference of Q"(X6, Y6) from the true display coordinates Q(x6, y6) corresponding thereto is greater than a predetermined threshold value. This means that there is a great displacement between the touch coordinates on the touch panel and the true display coordinates.

For each of the triangles QBD, QBC and QCD, second correction factor is obtained using the detected coordinates Q', B' and D'; Q', B' and C'; or Q', C' and D' of the correction points and evaluation point corresponding to the vertices thereof. The correction factors are obtained in the same manner as in the case of the triangle ABD using the expressions (1) through (4). Here, three sets of second correction factors a through f are obtained respectively for the three triangles.

Figure 1D:
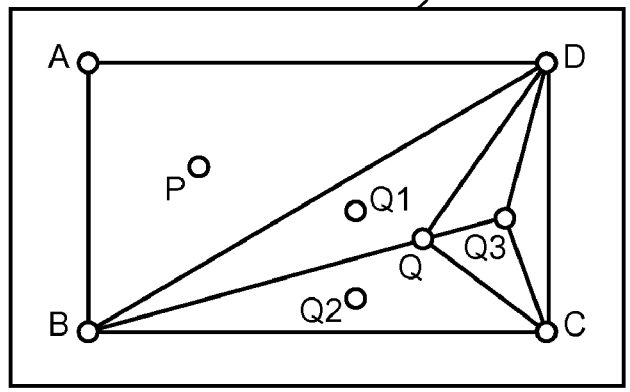

In FIG. 1D, evaluation points (third touch coordinates) Q1(x7, y7), Q2(x8, y8) and Q3(x9, y9) are displayed in the respective triangles QBP, QBC and QCD. The evaluation points Q1, Q2 and Q3 may be located at the centers of the corresponding triangles, because the positional displacement would be greater at the center and thus correction would be more likely required at those locations. The operator is caused to touch the three evaluation points. The touched coordinates Q1'(x7', y7'), Q2'(x8', y8') and Q3'(x9', y9') of the evaluation points are measured (detected). It is noted that display and detection of the evaluation points Q1 through Q3 may be carried out at the same time as display and detection of the two evaluation points P and Q described above. The detected coordinates Q1'(x7', y7'), Q2'(x8', y8') and Q3'(x9', y9') of the evaluation points Q1 through Q3 are substituted into the expressions (1) and (2), and converted to second corrected coordinates Q1"(X7, Y7), Q2"(X8, Y8) and Q3"(X9, Y9). For the coefficients a through f in the expressions (1) and (2), the values obtained from the expression (4) are used.

The difference between each set of the second corrected coordinates Q1"(X7, Y7), Q2"(X8, Y8) and Q3"(X9, Y9) and the corresponding set of the true display coordinates Q1(x7, y7), Q2(x8, y8) and Q3(x9, y9) is detected. If the detected difference is greater than a predetermined threshold value, the area of triangle including that evaluation point is further divided into three areas of triangles having the evaluation point as their common vertex. FIG. 1D shows the case where the triangle QCD is further divided into three triangles. The triangle QCD is made up of three triangles Q3QD, Q3QC and Q3CD having the evaluation point Q3 as their common vertex. For the triangles Q3QD, Q3QC and Q3CD obtained by the division, correction factors can be obtained using the expressions (1) through (4) in a similar manner. Subsequently, display, detection, evaluation (comparison), division . . . may be repeated for a new correction point, to carry out more detailed corrections.

The touch panel is provided on a display device to constitute an input/output device. The input/output device includes therein, or is connected to, a controller and a memory. The above-described correction factors are stored in the memory and read by the controller upon coordinate correction. The controller carries out arithmetic operations using the expressions (1) and (2), and the matrices (3) and (4).

Figure 2:
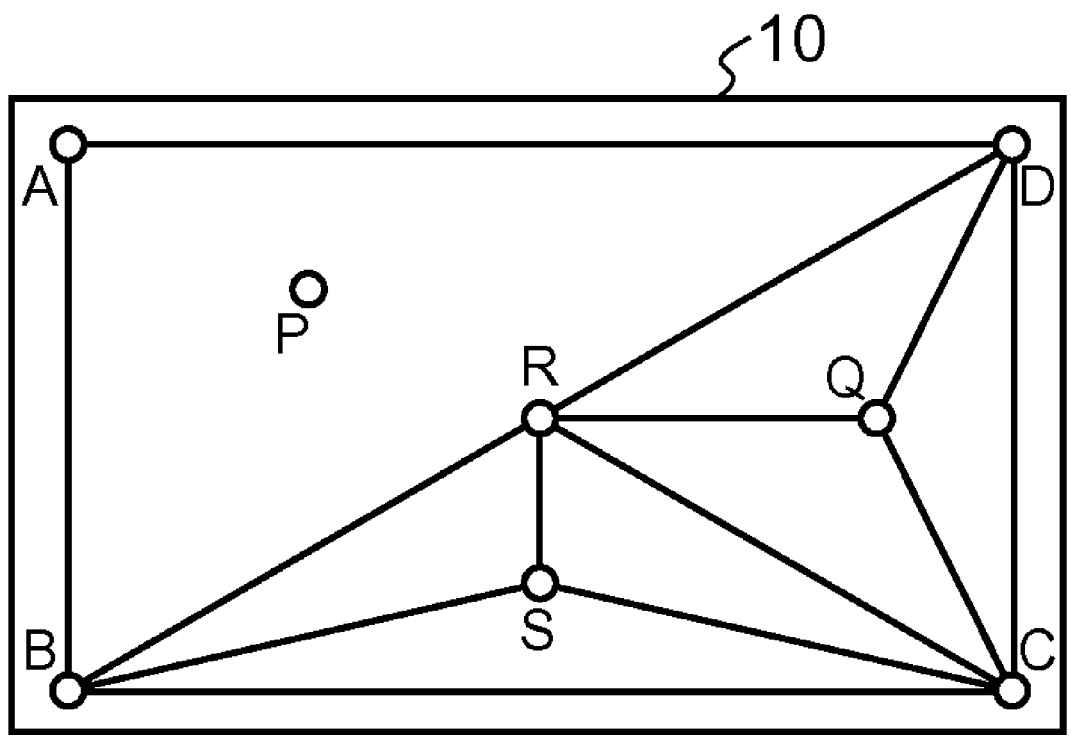
FIG. 2 shows, by way of example, how the area is divided according to the method of the present invention.

The present invention has been explained taking FIG. 1 as an example. The present invention however is not limited to this embodiment. It will be apparent to those skilled in the art that various modifications are possible without deviating from the scope of the invention. For example, as shown in FIG. 2, a point at the center of the touch panel 10 may be added as a correction point R, and the triangle BCD may firstly be divided into two triangles RBC and RCD instead of the case shown in FIG. 1(c). In this case, the two triangles RBC and RCD are each divided into three triangles using the evaluation points Q and S. The center point is selected as the correction point R because the positional displacement would become relatively great at the center of the touch panel.

As described above, according to the method of the present invention, in the case where the result of evaluation using evaluation points reveals the necessity of a more accurate correction model (factors), a correction point is additionally displayed on a display portion to generate smaller areas of triangles. In the smaller triangle areas, the displacement of the display position can be indicated more accurately. Accordingly, it is possible to provide a correction process that can be adapted in accordance with an evaluation result. Specifically, the following benefits are achieved:

a) it is possible to evaluate a displacement of the display position at a location other than the correction point;

b) as a result of evaluation using the correction point, if a more accurate correction model is required, it is possible to establish a more detailed model using the point that has been used for evaluation as an additional correction point; and c) it is possible to optimize the number of correction points required for establishment of a correction model in accordance with each touch panel.

The invention claimed is:

1. A method of correcting coordinates on a touch panel to true display coordinates, the method comprising:
   detecting four sets of first touch coordinates separate from each other on the touch panel;
   dividing an area delimited by the detected four sets of first touch coordinates on the touch panel into two areas of triangles;
   for each area of triangle, obtaining a first correction factor using the detected three sets of first touch coordinates corresponding to vertices of the triangle;
   detecting a set of second touch coordinates selected within a respective one of the areas of triangles;
   converting the detected set of second touch coordinates into a set of first corrected coordinates using the first correction factor;
   detecting a difference between the set of first corrected coordinates and a set of true display coordinates corresponding to the set of second touch coordinates;
   in the case where the detected difference is greater than a predetermined threshold value, further dividing the area of triangle having the set of second touch coordinates included therein into three areas of triangles having the set of second touch coordinates as their common vertex;
   for each of the three areas of triangles, obtaining a second correction factor using the set of second touch coordinates and the sets of first touch coordinates corresponding to vertices of the triangle; and
   wherein the touch panel is connected to a memory, and wherein the method further comprises: storing the first and second correction factors in the memory.

2. The method according to claim 1, further comprising the steps of:
   detecting a set of third touch coordinates selected within a respective one of the three areas of triangles;
   converting the detected set of third touch coordinates into a set of second corrected coordinates using the second correction factor;
   detecting a difference between the set of second corrected coordinates and a set of true display coordinates corresponding to the set of third touch coordinates; and
   in the case where the detected difference is greater than a predetermined threshold value, further dividing the area of triangle having the set of third touch coordinates included therein into three areas of triangles having the set of third touch coordinates as their common vertex.

3. The method according to claim 1, further comprising the step of, in the case where the detected difference is not greater than the predetermined threshold value, determining the set of first corrected coordinates as the corresponding set of true display coordinates.

4. The method according to claim 2, further comprising the step of, in the case where the detected difference is not greater than the predetermined threshold value, determining the set of second corrected coordinates as the corresponding set of true display coordinates.

5. The method according to claim 1, wherein the set of second touch coordinates is located approximately at a center of the area of the triangle.

6. The method according to claim 2, wherein the set of third touch coordinates is located approximately at a center of the area of the triangle.

* * * * *